(12) United States Patent
Voets et al.

(10) Patent No.: US 11,220,593 B2
(45) Date of Patent: Jan. 11, 2022

(54) PROPYLENE COPOLYMER COMPOSITION

(71) Applicant: SABIC Global Technologies B.V., Bergen op Zoom (NL)

(72) Inventors: Patrick Elisabeth Luc Voets, Born (NL); Henrica Norberta Alberta Maria Steenbakkers-Menting, Susteren (NL); Aurora Alexandra Batinas-Geurts, Sittard (NL); Désirée Marie Louise Seegers, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 220 days.

(21) Appl. No.: 16/304,874

(22) PCT Filed: May 22, 2017

(86) PCT No.: PCT/EP2017/062258
§ 371 (c)(1),
(2) Date: Nov. 27, 2018

(87) PCT Pub. No.: WO2017/202765
PCT Pub. Date: Nov. 30, 2017

(65) Prior Publication Data
US 2020/0325319 A1 Oct. 15, 2020

(30) Foreign Application Priority Data
May 27, 2016 (EP) .................................. EP16171720

(51) Int. Cl.
| C08L 23/14 | (2006.01) |
| C08L 23/16 | (2006.01) |
| B01J 8/02  | (2006.01) |
| B01J 8/24  | (2006.01) |
| C08F 2/34  | (2006.01) |
| C08F 4/64  | (2006.01) |

(52) U.S. Cl.
CPC ............. *C08L 23/14* (2013.01); *B01J 8/0207* (2013.01); *B01J 8/24* (2013.01); *C08F 2/34* (2013.01); *C08F 4/64* (2013.01)

(58) Field of Classification Search
CPC .................................. C08L 23/14; C08L 23/16
See application file for complete search history.

(56) References Cited

U.S. PATENT DOCUMENTS

2012/0095171 A1  4/2012  Kroezen et al.

FOREIGN PATENT DOCUMENTS

| CN | 102453186 A | 5/2012 | |
| CN | 103524903 A | 1/2014 | |
| EP | 1312623 A1 | 5/2003 | |
| EP | 1364986 A1 | 11/2003 | |
| EP | 2014715 B1 * | 12/2009 | ............. C08L 23/10 |
| EP | 2489685 B1 * | 8/2017 | ............. C08F 10/00 |
| KR | 20120077655 A | 7/2012 | |
| WO | 9611216 A1 | 4/1996 | |
| WO | 03068828 A1 | 8/2003 | |
| WO | 2004056922 A1 | 7/2004 | |
| WO | 2006002778 A1 | 1/2006 | |
| WO | WO-2013029699 A1 * | 3/2013 | ................ F16L 9/12 |
| WO | WO-2014095946 A1 * | 6/2014 | ............. F16L 9/127 |
| WO | 2015065990 A1 | 5/2015 | |

OTHER PUBLICATIONS

Bergstrom et al., "Investigation of teh Composite Molecular Structure of LDPE by Using Temperature Rising Elution Fractionation," Journal of Applied Polymer Science, vol. 23, 163-171 (1979).
International Search Report for International Application No. PCT/EP2017/062258; International Filing Date:May 22, 2017; dated Aug. 18, 2017; 3 Pages.
Jack L. Koenig; Spectroscopy of Polymers, 2nd Edition, Elsevier, 1999.
Moore, E.P. (1996) Polyproylene Handbook. Polymerization, Characterization, Properties, Processing, Applications, Hanser Publishers; New York, 1996.
Plumbing Africa, Aug. 2015, vol. 21, No. 6, 104 Pages.
Simplified Gas-Phase Polypropylene Process Technology, Petrochemical Review, 1993.
Wild et al.; "Crystallizability Distributions in Polymers: A New Analytical Technique": Polymer Preprint Am Chem Soc. vol. 17, 1977, p. 182.
Written Opinion of the International Searching Authority for International Application No. PCT/EP2017/062258; International Filing Date:May 22, 2017; dated Aug. 18, 2017; 4 Pages.
Borealis Group, "BorPEX, PP-R and PP-RCP materials for plumbing & heating pipe systems", 2012; 24 pages.
Reinhold, G. et al., "PP-RCT: A Newmaterial Class for Plumbing and Heating Applications"; 10 pages.

* cited by examiner

*Primary Examiner* — Catherine S Branch
(74) *Attorney, Agent, or Firm* — Cantor Colburn LLP

(57) ABSTRACT

The invention relates to a propylene copolymer composition comprising a propylene-ethylene copolymer, wherein the propylene-ethylene copolymer has a melt flow index in the range of 0.05 to 2.5 dg/min measured according to ISO1133 (2.16 kg/230° C.), wherein the propylene-ethylene copolymer is a unimodal propylene-ethylene copolymer and wherein a pipe prepared from the propylene copolymer composition according to ISO 1167-2 has a run time without failure of at least 2,500 h measured according to ISO1167-1 at a temperature of 95° C. and a hoop stress calculated according to ISO3213 of 4.2 MPa.

18 Claims, No Drawings

PROPYLENE COPOLYMER COMPOSITION

CROSS REFERENCE TO RELATED APPLICATIONS

This application is a 371 of International Application No. PCT/EP2017/062258, filed May 22, 2017, which is incorporated herein by reference in its entirety, and which claims priority to European Application Serial No. 16171720.2 filed May 27, 2016.

The invention relates to a propylene copolymer composition, to the use of the propylene copolymer composition and to articles, preferably pipes, comprising the propylene copolymer composition.

Polypropylene compositions consisting of a propylene homopolymer or a propylene copolymer are known. A propylene homopolymer is obtained by polymerizing propylene under suitable polymerization conditions. A random or block propylene copolymer is obtained by copolymerizing propylene and one or more other olefins, preferably ethylene, under suitable polymerization conditions. The preparation of propylene homopolymers and copolymers is, for example, described in Moore, E. P. (1996) Polypropylene Handbook. Polymerization, Characterization, Properties, Processing, Applications, Hanser Publishers: New York.

Polypropylene as piping material is mainly used in non-pressure applications (pipe and fitting) and profiles. The advantage of using polypropylene over other polyolefins is the good thermal resistance of polypropylene.

Polypropylene homopolymers, block copolymers and random copolymers are used in pipe. Propylene homopolymers give good pipe rigidity but the impact and creep properties are not very good. Block copolymers give good impact properties but the creep properties are similar to polypropylene homopolymers due to the homopolymer matrix. Random copolymers give better creep resistance compared to propylene homopolymers and block copolymers. Their impact strength is also good. For this reason, random copolymers are used in pressure pipe applications for hot water and industrial pipes.

One of the most important properties of a polymer material used for hot and cold water pressure pipes is its resistance to internal pressure at different temperatures. A standardized method to measure the internal pressure at different temperatures of pipes is described in ISO 1167. ISO 1167-2 specifies the method of preparation of the pipes. The test to determine the time to failure is performed according to ISO 1167-1. The time to failure and the type of failure (brittle, ductile or mixed) at given hoop stresses are determined by this test. The hoop stress applied to the pipe during the test is calculated according to ISO 3213.

An MRS class is a classification of a material for its suitability for use in pressurized pipes and how well the pipes can withstand water pressure for a 50 year period of time. A process for producing pipes with good impact strength, stiffness and an MRS class of 8 by using a random propylene-ethylene copolymer is known.

WO 96/11216 discloses a copolymer composition prepared from copolymers of propene and α-olefin having 2 to 12 carbon atoms, having high molecular weight, a broad molecular weight distribution and an improved comonomer distribution. The use of the composition includes pipes. The composition is made in two or several reactors.

Plumbing Africa, August 2015, Vol 21, Number 6 describes a plastic piping system for internal plumbing and heating, in which limitations in mechanical performance and processability of unimodal PP-R materials were overcome by bimodal PP-R materials such as Borouge's RA130E.

In EP1364986 and EP1312623, a propylene copolymer consisting of polypropylene, C4-C8 a-olefin and/or C2 is disclosed where the propylene copolymer is at least partially crystallized in the β-modification. This gives a better pressure resistance, also at elevated temperatures. In EP1364986 and 1312623, β-nucleating agent and bimodality are used to obtain high MRS class.

WO2006/2778 discloses the use of hexene-1 in combination with a broad molecular weight distribution, wherein the hexene-1 content in the fraction with a higher intrinsic viscosity is higher than in the fraction with a lower intrinsic viscosity.

However, an MRS class of 10 has not been achieved by a random propylene-ethylene copolymer made in one reactor. It is an objective of the present invention to provide a propylene copolymer composition suitable for use in a pipe, which can be obtained by a simple process.

The invention provides a propylene copolymer composition comprising a propylene-ethylene copolymer,
wherein the propylene-ethylene copolymer has a melt flow index in the range of 0.05 to 2.5 dg/min measured according to ISO1133 (2.16 kg/230° C.),
wherein the propylene-ethylene copolymer is a unimodal propylene-ethylene copolymer,
wherein a pipe prepared from the propylene copolymer composition according to ISO 1167-2 has a run time without failure of at least 2500 hours measured according to ISO1167-1 at a temperature of 95° C. and a hoop stress calculated according to ISO3213 of 4.2 MPa.

The inventors have found that a composition from which a pipe can be prepared having a high resistance to internal pressure at different temperatures can be obtained using a one stage polymerization process and using ethylene as the only comonomer.

The high resistance of a pipe prepared from the propylene copolymer composition is indicated by a long run time without failure. For measuring the resistance, a pipe is prepared from the propylene copolymer composition according to ISO 1167-2. According to ISO1167-1, a run time without failure of the pipe is measured while a hoop stress of 4.2 MPa measured according to ISO3213 is applied to the pipe at a temperature of 95° C. The run time without failure of the pipe according to the invention is at least 2500 h (hours).

A propylene-ethylene copolymer may either be a unimodal type or a multimodal type. The propylene-ethylene copolymer according to the invention is a unimodal type.

It is herein understood that the term 'unimodal propylene-ethylene copolymer' is a propylene-ethylene copolymer which is unimodal with respect to molecular weight distribution, comonomer content and melt flow index, whereby the copolymer can be polymerised in a single stage batch or preferably a continuous process. The polymerization can be a slurry or gas phase, preferably a slurry, such as loop, polymerization.

The unimodal propylene-ethylene copolymer is preferably produced in one reactor, however, the unimodal propylene-ethylene copolymer may also be produced in a multistage process using, at each stage, process conditions which result in similar polymer properties. The process conditions are substantially the same in these stages, meaning that temperature, pressure, concentrations of the reactants and the catalysts are substantially the same, for example the deviations in each of these conditions is not more than 10%.

The use of a one stage polymerization process is advantageous since it is a simple process using only one reactor.

Comonomer

The propylene copolymer in the composition of the present invention consists of a propylene-ethylene copolymer.

Preferably, the amount of ethylene in the propylene-ethylene copolymer is 2.5 to 4.5 wt %, more preferably 3.1 to 4 wt %, based on the total propylene-ethylene copolymer.

MFI

The propylene-ethylene copolymer in the composition of the present invention has a melt flow index in the range of 0.05 to 2.5 dg/min measured according to ISO1133 (2.16 kg/230° C.). For example, the melt flow index (MFI) is at least 0.10 dg/min or at least 0.13 dg/min, and/or at most 2.0 dg/min, at most 1.0 dg/min, at most 0.8 dg/min, at most 0.5 dg/min, at most 0.4 dg/min or at most 0.35 dg/min.

Preferably, the propylene-ethylene copolymer has a melt flow index in the range of 1 to 10 dg/min measured according to ISO1133 (10.0 kg/230° C.).

Preferably, the propylene-ethylene copolymer has a ratio between the MFI measured according to ISO1133 (2.16 kg/230° C.) and the MFI measured according to ISO1133 (10.0 kg/230° C.) of 0.01 to 0.1. A higher value of this ratio is an indication of a broader MWD.

MWD

Preferably, the propylene-ethylene copolymer in the composition of the present invention has a molecular weight distribution (Mw/Mn) of 5 to 12 wherein Mw stands for the weight average molecular weight and Mn stands for the number average weight, both of which are measured according to ASTM D6474-12 (Standard Test Method for Determining Molecular Weight Distribution and Molecular Weight Averages of Polyolefins by High Temperature Gel Permeation Chromatography).

XS

Preferably, the propylene-ethylene copolymer in the composition of the present invention has a cold xylene soluble content of less than 10 wt %.

Production of Propylene-Ethylene Copolymer

The propylene-ethylene copolymer in the composition of the present invention is preferably a random propylene-ethylene copolymer.

The term "random propylene-ethylene copolymer," as used herein, is a copolymer containing monomers of propylene and monomers of ethylene polymerized together to form a polymer wherein the individual repeating units are present in a random or statistical distribution in the polymer chain.

The term "Koenig B-Value" is a measurement of the comonomer distribution across a polymer chain. The "Koenig B-Value" calculates the distribution of the ethylene units of a propylen-ethylene copolymer across the polymer chain. Koenig B-values range from 0 to 2 with 1 designating a perfectly random distribution of comonomer units. The higher the Koening B value, the more alternating the comonomer distribution in the copolymer. The lower the Koenig B value, the more blocky or clustered the comonomer distribution in the copolymer.

The Koenig B-Value is determined according to the method of J. L. Koenig (Spectroscopy of Polymers, 2nd Edition, Elsevier, 1999). B is defined for a propylene/ethylene copolymer as:

$$B = f(EP+PE)/(2 \cdot F_E \cdot F_p)$$

where f(EP+PE)=the sum of the EP and PE diad fractions; $F_E$ and $F_p$=the mole fraction of ethylene and propylene in the copolymer, respectively. The diad fraction can be derived from triad data according to:

$$f(EP+PE)=[EPE]+[EPP+PPE]/2+[PEP]+[EEP+PEE]/2.$$

The propylene-ethylene copolymer of the composition according to the invention is preferably a random propylene-ethylene copolymer, for example the propylene-ethylene copolymer has a Koenig B value of 0.5 to 1.5, for example from 0.8 to 1.2.

The propylene-ethylene copolymer of the composition according to the invention can be produced using any conventional technique known to the skilled person, such as bulk polymerization, gas phase polymerization, slurry polymerization, solution polymerization. Preferably the propylene-ethylene copolymer is produced using a gas phase polymerization, for example in a horizontal stirred bed reactor or in a fluidized bed reactor, which may for example be operated in condensed mode.

As mentioned in US2012095171, gas-phase or vapor-phase olefin polymerization processes are disclosed generally in "Polypropylene Handbook" pp. 293-298, Hanser Publications, NY (1996), and more fully described in "Simplified Gas-Phase Polypropylene Process Technology" presented in Petrochemical Review, March, 1993. These publications are hereby incorporated herein by reference.

The invention further relates to a process for the preparation of the propylene copolymer composition according to the invention, comprising the step of contacting propylene and ethylene in a gas phase reactor, preferably in one reactor. According to the invention, the propylene-ethylene copolymer is preferably prepared in the presence of a catalyst disclosed in WO03/068828. WO03/068828 describes suitable catalysts for the present invention as a solid catalyst component for polymerization of olefins, comprising magnesium, titanium, a halogen and an electron donor, wherein said electron donor comprises at least one polyol ester compounds of the formula (I):

$$R_1CO—O—CR_3R_4\text{-}A\text{-}CR_5R_6—O—CO—R_2 \quad (1)$$

wherein, $R_1$ and $R_2$ groups, which may be identical or different, can be substituted or unsubstituted hydrocarbyl having 1 to 20 carbon atoms, $R_3$-$R_6$ groups, which may be identical or different, can be selected from the group consisting of hydrogen, halogen or substituted or unsubstituted hydrocarbyl having 1 to 20 carbon atoms, $R_1$-$R_6$ groups optionally contain one or more hetero-atoms replacing carbon, hydrogen atom or the both, said hetero-atom is selected from the group consisting of nitrogen, oxygen, sulfur, silicon, phosphorus and halogen atom, two or more of $R_3$-$R_6$ groups can be linked to form saturated or unsaturated monocyclic or polycyclic ring;

A is a single bond or bivalent linking group with chain length between two free radicals being 1-10 atoms, wherein said bivalent linking group is selected from the group consisting of aliphatic, alicyclic and aromatic bivalent radicals, and can carry $C_1$-$C_{20}$ linear or branched substituents; one or more of carbon atom and/or hydrogen atom on the above-mentioned bivalent linking group and the substituents can be replaced by a hetero-atom selected from the group consisting of nitrogen, oxygen, sulfur, silicon, phosphorus, and halogen atom, and two or more said substituents on the linking group as well as above-mentioned $R_3$-$R_6$ groups can be linked to form saturated or unsaturated monocyclic or polycyclic ring.

All examples of the solid catalyst components mentioned in WO03/068828 are incorporated herein by reference as catalysts suitable for the preparation for the random propylene copolymer according to the invention.

Preferably, the electron donor in the catalyst used for preparing the propylene-ethylene copolymer in the composition according to the invention is

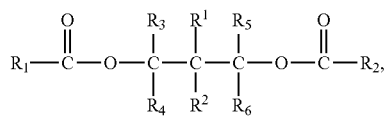

wherein $R_1=R_2=$phenyl, $R_3=R_5=$methyl, $R^1=R^2=R_4=R_6=$hydrogen. This is 2,4-pentanediol dibenzoate as described in synthetic example 5 of WO03/068828.

Additives

The propylene copolymer composition according to the invention may contain additives. Additives suitable for use in pipes include but are not limited to nucleating agents, stabilizers, anti-oxidants pigments and/or colorants, impact modifiers, flame retardants, acid scavengers, anti-microbials and the like. Such additives are well known in the art. The skilled person will choose the type and amount of additives such that they do not detrimentally influence the aimed properties of the composition.

The amount of the additive in the polypropylene composition is chosen from 0 and 5 wt % based on the total weight of the polypropylene composition, preferably the amount of additive is from 0.01 and 3 wt %, for example from 0.1 to 2 wt %, based on the total weight of the polypropylene composition.

Process

The composition of the invention may be obtained by a process comprising melt-mixing the propylene-ethylene copolymer with applicable additives. Preferably, the composition of the invention is made in a form that allows easy processing into a shaped article in a subsequent step, like in pellet or granular form. The composition can be a mixture of different particles or pellets; like a blend of the propylene-ethylene copolymer and a masterbatch of additives. Preferably, the composition of the invention is in pellet or granular form as obtained by mixing all components in an apparatus like an extruder; the advantage being a composition with homogeneous and well-defined concentrations of the additives.

With melt-mixing is meant that the components are mixed at a temperature that exceeds the melting point of the propylene-ethylene copolymer. Melt-mixing may be done using techniques known to the skilled person, for example in an extruder. Generally, in the process of the invention, melt-mixing is performed at a temperature in the range from 20-300° C.

Suitable conditions for melt-mixing, such as temperature, pressure, amount of shear, screw speed and screw design when an extruder is used are known to the skilled person.

When using an extruder, a conventional extruder such as a twin-screw extruder may be used. The temperature can vary through the different zones of the extruder as required. For example, the temperature may vary from 100° C. in the feed zone to 300° C. at the die. Preferably, the temperature in the extruder varies from 200 to 290° C.; lower temperatures may impede reactions between the peroxide and an optional co-agent, for example polyfunctional monomers such as BDDMA and, as a consequence, compositions with the desired melt flow index may not be obtained; too high temperatures may induce undesired degradation processes, which may for example result in compositions having poor mechanical properties. Likewise, the screw speed of the extruder may be varied as needed. Typical screw speed are in the range from about 100 rpm to about 400 rpm.

The residence time in the extruder for the propylene-ethylene copolymer may be lower than 1 minute, for example between 10 and 40 seconds.

The composition according to the invention is preferably processed using extrusion. The invention further relates to an article comprising the composition according to the invention. In particular, the invention relates to an article comprising the composition according to the invention, wherein the article is made by extrusion. Extrusion is for example widely used to produce articles, such as rods, sheets, films and pipes.

Preferably, the article according to the invention is a pipe, a sheet or a film. Particularly preferred, the article according to the invention is a pipe.

The invention further relates to a process for the production of a pipe from the propylene copolymer composition according to the invention.

The invention further relates to use of the propylene copolymer composition according to the invention for the production of a pipe.

The pipe is prepared preferably from at least 95 wt %, for example at least 96 wt %, for example at least 97 wt %, for example at least 98 wt % of the propylene-ethylene copolymer based on the pipe as described above.

In another embodiment therefore, the invention also relates to a pipe containing at least 95 wt % for example at least 96 wt %, for example at least 97 wt %, for example at least 98 wt % of the propylene-ethylene copolymer of the invention.

Pipe Properties

A pipe prepared from the propylene copolymer composition according to ISO 1167-2 has a run time without failure of at least 2500 h measured according to ISO1167-1 at a temperature of 95° C. and a hoop stress calculated according to ISO3213 of 4.2 MPa.

Preferably, a pipe prepared from the propylene copolymer composition according to ISO 1167-2 has a run time without failure of at least 750 h measured according to ISO1167-1 at a temperature of 95° C. and a hoop stress calculated according to ISO3213 of 4.4 MPa.

Preferably, a pipe prepared from the propylene copolymer composition according to ISO 1167-2 has a run time without failure of at least 100 h measured according to ISO1167-1 at a temperature of 95° C. and a hoop stress calculated according to ISO3213 of 4.9 MPa.

Preferably, a pipe prepared from the propylene copolymer composition according to ISO 1167-2 has a run time without ductile failure of at least 100 h measured according to ISO1167-1 at a temperature of 20° C. and a hoop stress calculated according to ISO3213 of 15.5 MPa.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

The invention is now elucidated by way of the following examples, without however being limited thereto.

Test Methods

Comonomer Content (TC2)

The comonomer content in the propylene copolymer is determined by $^{13}C$ NMR according to known procedures.

MFI

For purpose of the present invention, melt flow index is determined by measuring the melt flow rate, also called melt index, according to ISO1133 at a weight of 2.16 kg or 10.0 kg and a temperature of 230° C.

Cold Xylene Solubles (XS)

1 gram of polymer and 100 ml of xylene are introduced in a glass flask equipped with a magnetic stirrer. The temperature is raised up to the boiling point of the solvent. The so obtained clear solution is then kept under reflux and stirring for further 15 min. Heating is stopped and the isolating plate between heating and flask is removed. Cooling takes places with stirring for 5 min. The closed flask is then kept for 30 min in a thermostatic water bath at 25° C. for 30 min. The so formed solid is filtered on filtering paper. 25 ml of the filtered liquid is poured in a previously weighed aluminium container, which is heated in a stove of 140° C. for at least 2 hours, under nitrogen flow and vacuum, to remove the solvent by evaporation. The container is then kept in an oven at 140° C. under vacuum until constant weight is obtained. The weight percentage of polymer soluble in xylene at room temperature is then calculated.

Impact Strength (Izod Notched 23° C., // and L)

For purpose of the present invention, impact strength is determined by measuring the Izod impact strength at 23° C. according to ISO 180 4A, Test geometry: 65*12.7*3.2 mm, notch 45° according to ISO 37/2, parallel (//) and perpendicular (L) orientation.

Stiffness (Flexural Modulus 23° C., // and L)

For purpose of the present invention, stiffness is determined by measuring the flexural modulus according to ASTM D790-10. Flexural modulus was determined on 3.2 mm thick specimens according to ISO37/2, parallel (//) and perpendicular (L) orientation.

Internal Pressure Test:

A pipe is prepared from the propylene copolymer composition according to ISO 1167-2. The measurement of the long-term hydrostatic strength of thermoplastics materials is carried out according to ISO 1167-1. The tests are carried out at described hoop stresses (measured according to ISO3213) and temperatures of 95° C. and 20° C.

Molecular Weight Distribution (MWD)

Mw (weight average molecular weight) and Mn (number average weight) of the propylene-ethylene copolymer are measured according to ASTM D6474-12 (Standard Test Method for Determining Molecular Weight Distribution and Molecular Weight Averages of Polyolefins by High Temperature Gel Permeation Chromatography).

Fractionation:
1. Samples were fractionated using pTREF on aglass column filled with glass beads (as described in Bergstrom, J. Appl. Polym. Sci., 23, 1979, 163-171 & Wild, Polym Preprint Am Chem Soc 18, 1977, 182) Two gram of the samples were dissolved in xylene (4 hrs at 132° C.) and crystallized on a glass column with following steps:
2. Cooling step: the solution was cooled down to 120° C. by decreasing the temperature at a cooling rate of 1° C./min.
3. Crystallization step: the solution was cooled down to 20° C. by decreasing the temperature at a cooling rate of 1.5° C./hour.
4. Fractionation step:
   1. <20° C.
   2. 20-55° C.
   3. 55-75° C.
   4. 75-84° C.
   5. 84-89° C.
   6. 89-92° C.
   7. 92-95° C.
   8. 95-98° C.
   9. 98-100° C.

The polymers in the different fractions were precipitated in methanol and the dispersion was subsequently filtrated and dried under vacuum at 45° C. overnight. For each fraction, the amount and the molecular weight were measured.

EXPERIMENTS

Preparation of Random Propylene Ethylene Copolymer

Gas-phase polymerization of the propylene-ethylene copolymer was performed in a horizontal, stirred bed cylindrical reactor. The amount of ethylene in the copolymer (TC2) was controlled by adjusting the ratio between ethylene and propylene in the recycling gas in the reactor based on gas chromatography analysis. TC2 was measured using $^{13}C$ NMR according to known procedures.

Examples 1-3 were prepared with catalyst as described in WO03/068828.

Comparative example A is the propylene random copolymer RA130E, which is commercially available from BOREALIS.

Comparative example B is the propylene random copolymer P9421, which is commercially available from SABIC.

For the random polymerization the hydrogen concentration in the off gas was controlled to achieve the targeted melt flow rate.

The propylene-ethylene copolymer powders as obtained were mixed with additives and melt-extruded to obtain granules.

Various properties of the random propylene-ethylene copolymers and the compositions thus obtained were measured and are shown in Table 1.

Preparation of Pipe

The granules were used to extrude a pipe of 32*3.0 mm on a Reifenhauser S 50/30D/I- and S 50/30 D/II-Extruder according to ISO 1167-2.

Hydrostatic pipe testing was carried out according to ISO 1167-1 at 95° C. and the hours after which the pipe failed under a hoop stress of either 4.2, 4.5 and 4.9 MPa (measured according to ISO3213) are mentioned in table 1.

Hydrostatic pipe testing was carried out according to ISO 1167-2 at 20° C. and the hours after which the pipe failed with ductile failure under a hoop stress of 15.5 MPa (measured according to ISO3213) are mentioned in table 1.

TABLE 1

| Composition | | Ex 1 | Ex 2 | Ex 3 | CEx A | CEx B |
|---|---|---|---|---|---|---|
| TC2 | wt % | 3.3 | 3.8 | 3.3 | 3.7 | 3.6 |
| MFI (2.16 kg) granules | dg/min | 0.18 | 0.21 | 0.14 | 0.22 | 0.24 |
| MFI (10 kg) granules | dg/min | 4.01 | 4.97 | | | |
| MFI 2.16/MFI 10 | | 0.050 | 0.052 | | | |
| Mw/Mn | | 13.7 | 10.3 | 9.5 | 6.2 | 5.6 |
| XS granules | % | 6.2 | 8.5 | 7 | 6.1 | 8.1 |
| Izod notched 23° C. // | [kJ/m2] | 9.01 | 16.94 | 13.7 | 13.7 | |
| Izod notched 23° C. L | [kJ/m2] | 6.87 | 9.05 | 9.35 | | |
| Flex mod 23 ° C. // | [MPa] | 1102 | 934 | 1049 | 1034 | |
| Flex mod 23 ° C. L | [MPa] | 1183 | 1032 | 1111 | | |
| Pipe test at 95° C. | | | | | | |
| time to failure 4.2 Mpa | [h] | 3541.5 | 3233.5 | 3992.5 | 2100 | 1043 |
| time to failure 4.4 Mpa | [h] | 3123 | | 2899.5 | 1400 | 715 |
| time to failure 4.9 Mpa | [h] | 779.5 | 1452 | 1115.5 | | |
| Pipe test at 20° C. | | | | | | |
| time to ductile failure at 15.5 MPa | [h] | 413.5 | 153 | 637 | 131.86 | 26 |

It can be concluded from Table 1 that the time to failure is much longer for a pipe made from the composition according to the invention made in one reactor as compared to CEx B made in one reactor and at least similar compared to CEx A prepared in at least two reactors.

The results of the fractionation are summarized in Table 2.

TABLE 2

| Glass column temperature (° C.) | Ex 2 rel. amount % w/w | Mw | CEx A rel. amount % w/w | Mw | CEx B rel. amount % w/w | Mw |
|---|---|---|---|---|---|---|
| 89 | 22.6 | 730 | 22.1 | 705 | 10.5 | 430 |
| 92 | 21.9 | 1200 | | | 7.9 | 490 |
| 95 | 10.8 | 1700 | 22.5 | 890 | 8.4 | 490 |

It can be seen that the total amount of propylene-ethylene copolymer fractions that elute from a glass column filled with glass beads in the temperature range from 89 to 92° C. is high in the composition of Ex 2 compared to CEx A and CEx B.

Therefore, the invention also relates to a propylene copolymer composition, wherein the total amount of propylene-ethylene copolymer fractions that elute from a glass column filled with glass beads in the temperature range from 89 to 92° C. is at least 35 wt % based on the total propylene-ethylene copolymer present in the composition, preferably is at least 40 wt % based on the total propylene-ethylene copolymer present in the composition.

Since the ethylene content (TC2) in each of the temperature fractions is similar, the relative amounts of the temperature fractions are indications of the distribution of C2 in the copolymer. It can therefore be concluded that the distribution of C2 in the copolymer is shifted more towards the lower temperature ranges in Ex 2 than CEx A and CEx B.

The invention claimed is:

1. A propylene copolymer composition comprising at least 95 weight percent of a propylene-ethylene copolymer, wherein the propylene-ethylene copolymer has a melt flow index in the range of 0.05 to 2.5 dg/min measured according to ISO1133 (2.16 kg/230° C.), wherein the propylene-ethylene copolymer is a unimodal propylene-ethylene copolymer and wherein the composition is free of beta-nucleating agent and an extruded pipe prepared from the propylene copolymer composition according to ISO 1167-2 has a run time without failure of at least 2500 h measured according to ISO1167-1 at a temperature of 95° C. and a hoop stress calculated according to ISO3213 of 4.2 MPa.

2. The propylene copolymer composition according to claim 1, wherein the total amount of propylene-ethylene copolymer fractions that elute from a glass column filled with glass beads in the temperature range from 89 to 92° C. is at least 35 wt % based on the total propylene-ethylene copolymer present in the composition.

3. The propylene copolymer composition according to claim 1, wherein a pipe prepared from the propylene copolymer composition according to ISO1167-2 has a run time without ductile failure of at least 100 hours as measured according to ISO1167-1 at a temperature of 20° C. and a hoop stress calculated according to ISO3213 of 15.5 MPa.

4. The propylene copolymer composition according to claim 1, wherein the ethylene content in the propylene-ethylene copolymer is from 2.5 to 5.0 wt % based on the total propylene-ethylene copolymer.

5. The propylene copolymer composition according to claim 1, wherein the propylene-ethylene copolymer has a cold xylene soluble content of less than 10 wt %.

6. The propylene copolymer composition according to claim 1, wherein the propylene copolymer has a ratio between the melt flow index measured according to ISO1133 (2.16 kg/230° C.) and the melt flow index measured according to ISO1133 (10.0 kg/230° C.) of 0.010 to 0.10.

7. The propylene copolymer composition according to claim 1, wherein the propylene copolymer has a molecular weight distribution (Mw/Mn) of 6 to 12.

8. The propylene copolymer composition according to claim 1, wherein the propylene copolymer is prepared under the presence of a solid catalyst component for polymerization of olefins, comprising magnesium, titanium, a halogen and an electron donor, wherein said electron donor comprises at least one polyol ester compounds of the formula (I):

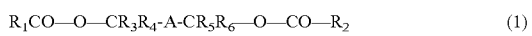

$$R_1CO-O-CR_3R_4-A-CR_5R_6-O-CO-R_2 \quad (1)$$

wherein, $R_1$ and $R_2$ groups, which may be identical or different, can be substituted or unsubstituted hydrocarbyl having 1 to 20 carbon atoms, $R_3$-$R_6$ groups, which may be identical or different, can be selected from the group consisting of hydrogen, halogen or substituted or unsubstituted hydrocarbyl having 1 to 20 carbon atoms, $R_1$-$R_6$ groups optionally contain one or more heteroatoms replacing carbon, hydrogen atom or the both, said hetero-atom is selected from the group consisting of nitrogen, oxygen, sulfur, silicon, phosphorus and halogen atom, two or more of $R_3$-$R_6$ groups can be linked to form saturated or unsaturated monocyclic or polycyclic ring;

A is a single bond or bivalent linking group with chain length between two free radicals being 1-10 atoms, wherein said bivalent linking group is selected from the group consisting of aliphatic, alicyclic and aromatic bivalent radicals, and can carry $C_1$-$C_{20}$ linear or branched substituents; one or more of carbon atom and/or hydrogen atom on the above-mentioned bivalent linking group and the substituents can be replaced by a hetero-atom selected from the group consisting of nitrogen, oxygen, sulfur, silicon, phosphorus, and halogen atom, and two or more said substituents on the linking group as well as above-mentioned $R_3$-$R_6$ groups can be linked to form saturated or unsaturated monocyclic or polycyclic ring.

9. The propylene copolymer composition according to claim 1, wherein the propylene-ethylene copolymer is prepared in gas phase polymerization process.

10. The propylene copolymer composition according to claim 1 further comprising additives.

11. The propylene copolymer composition according to claim 1, wherein
an extruded pipe prepared from the propylene copolymer composition according to ISO 1167-2 has a run time without failure of at least 750 h measured according to ISO1167-1 at a temperature of 95° C. and a hoop stress calculated according to ISO3213 of 4.4 MPa, and/or
an extruded pipe prepared from the propylene copolymer composition according to ISO 1167-2 has a run time without failure of at least 100 h measured according to ISO1167-1 at a temperature of 95° C. and a hoop stress calculated according to ISO3213 of 4.9 MPa.

12. A process for the preparation of the propylene copolymer composition according to claim 1, comprising contacting propylene and ethylene in a gas phase reactor.

13. A process for the production of a pipe comprising providing the copolymer composition according to claim 1 and forming it into the pipe.

14. A pipe comprising the propylene copolymer composition according to claim 1.

15. The pipe according to claim 14, wherein the pipe is prepared contains at least 95 wt % of the propylene-ethylene copolymer based on the pipe.

16. The process according to claim 12, wherein the contacting of the propylene and the ethylene is in one reactor.

17. The process according to claim 12, wherein the contacting of the propylene and the ethylene is in the presence of a solid catalyst component for polymerization of olefins, comprising magnesium, titanium, a halogen and an electron donor, wherein said electron donor comprises at least one polyol ester compounds of the formula (I):

$$R_1CO\text{—}O\text{—}CR_3R_4\text{-}A\text{-}CR_5R_6\text{—}O\text{—}CO\text{—}R_2 \qquad (1)$$

wherein, $R_1$ and $R_2$ groups, which may be identical or different, can be substituted or unsubstituted hydrocarbyl having 1 to 20 carbon atoms, $R_3$-$R_6$ groups, which may be identical or different, can be selected from the group consisting of hydrogen, halogen or substituted or unsubstituted hydrocarbyl having 1 to 20 carbon atoms, $R_1$-$R_6$ groups optionally contain one or more heteroatoms replacing carbon, hydrogen atom or the both, said hetero-atom is selected from the group consisting of nitrogen, oxygen, sulfur, silicon, phosphorus and halogen atom, two or more of $R_3$-$R_6$ groups can be linked to form saturated or unsaturated monocyclic or polycyclic ring;

A is a single bond or bivalent linking group with chain length between two free radicals being 1-10 atoms, wherein said bivalent linking group is selected from the group consisting of aliphatic, alicyclic and aromatic bivalent radicals, and can carry $C_1$-$C_{20}$ linear or branched substituents; one or more of carbon atom and/or hydrogen atom on the above-mentioned bivalent linking group and the substituents can be replaced by a hetero-atom selected from the group consisting of nitrogen, oxygen, sulfur, silicon, phosphorus, and halogen atom, and two or more said substituents on the linking group as well as above-mentioned $R_3$-$R_6$ groups can be linked to form saturated or unsaturated monocyclic or polycyclic ring.

18. The composition of claim 1 comprising at least 96 weight percent of the propylene-ethylene copolymer.

* * * * *